United States Patent
Carmody et al.

[15] 3,673,126
[45] June 27, 1972

[54] CONTINUOUS PROCESS FOR MAKING EXPANDABLE THERMOPLASTIC RESIN COMPOSITIONS

[72] Inventors: William D. Carmody; Charles J. Thompson; George J. Butzler, all of Midland, Mich.

[73] Assignee: The Dow Chemical Company, Midland, Mich.

[22] Filed: Nov. 13, 1967

[21] Appl. No.: 682,436

[52] U.S. Cl. ..........................260/2.5 E, 260/2.5 B, 264/53, 264/143, 264/349
[51] Int. Cl. ..............................................C08j 1/26
[58] Field of Search....................................264/83; 260/2.5 E

[56] References Cited

UNITED STATES PATENTS

| | | | |
|---|---|---|---|
| 2,450,436 | 10/1948 | McIntire | 260/2.5 E |
| 2,676,927 | 4/1954 | McCurdy et al. | 260/2.5 E |
| 2,727,884 | 12/1955 | McDonald et al. | 260/93.5 S |
| 3,026,273 | 3/1962 | Engles | 260/2.5 E |
| 3,287,286 | 11/1966 | Ohlinger et al. | 260/2.5 |
| 3,344,215 | 9/1967 | Witz et al. | 264/53 |
| 2,530,409 | 11/1950 | Stober et al. | 260/88.2 |
| 3,362,919 | 1/1968 | Rood | 260/2.5 E |

Primary Examiner—Murray Tillman
Assistant Examiner—Morton Foelak
Attorney—Griswold & Burdick and Sidney J. Walker

[57] ABSTRACT

A continuous process for the production of expandable thermoplastic polymer compositions obviating the use of a pressure vessel for polymerization is described. Freshly polymerized, devolatilized polymeric melt and a blowing agent are mixed prior to complete cooling of the melt and extruding the mixture at a continuous rate equal to the rate at which the mixture is supplied, to obtain greatly improved product properties.

3 Claims, 1 Drawing Figure

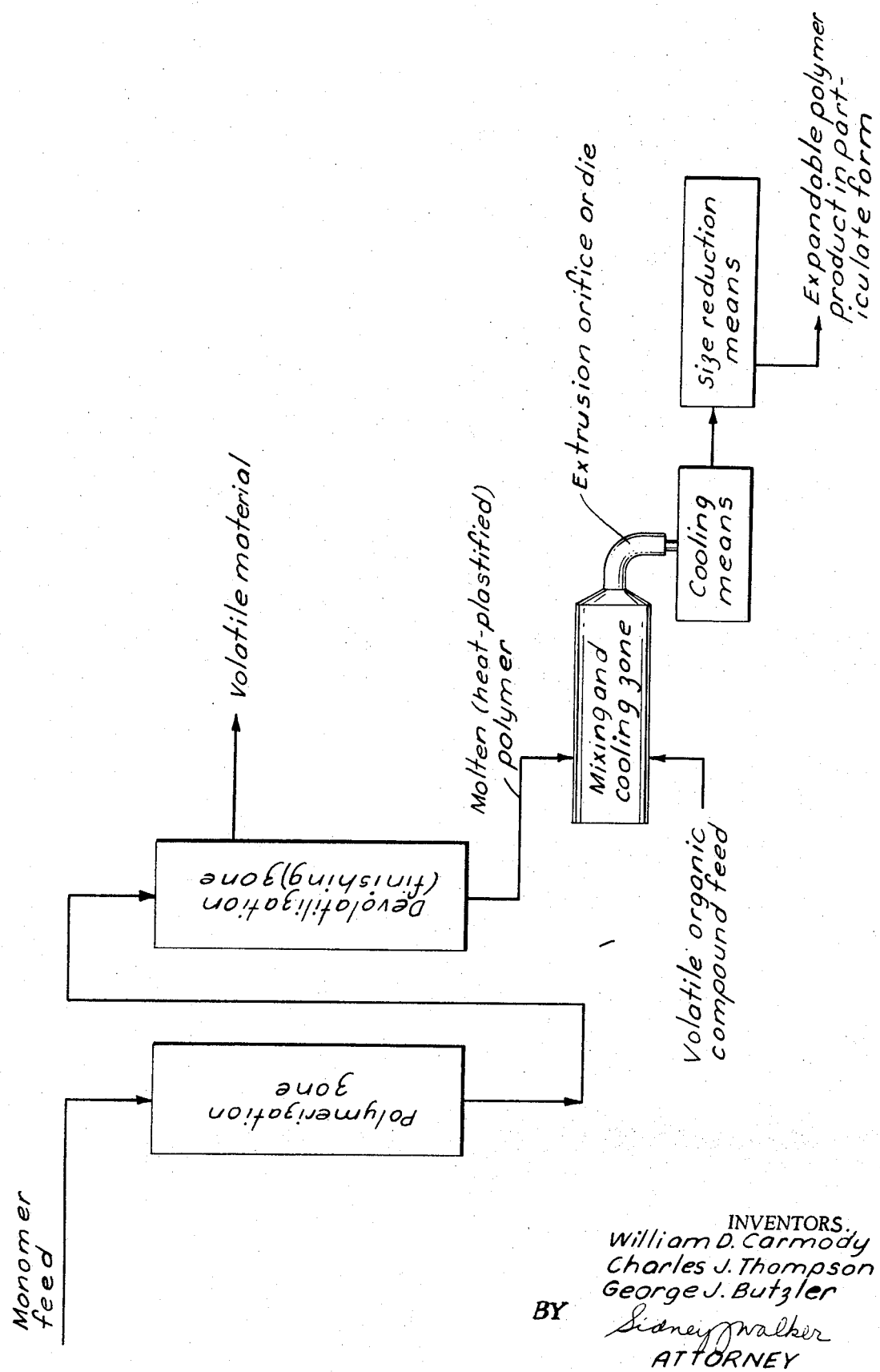
INVENTORS.
William D. Carmody
Charles J. Thompson
George J. Butzler
BY Sidney Walker
ATTORNEY

CONTINUOUS PROCESS FOR MAKING EXPANDABLE THERMOPLASTIC RESIN COMPOSITIONS

This invention relates to a continuous process for making expandable thermoplastic resin compositions.

U.S. Pat. No. 3,287,286 discloses a continuous process for making expandable styrene polymers by continuously introducing at the top of a pressure vessel having a diameter less than its height (1) styrene or a mixture of monomeric styrene with one or more monoethylenically unsaturated compounds copolymerizable therewith, and (2) a volatile organic expanding agent, polymerizing the styrene or the monomer mixture, the temperature at the top of the pressure vessel being between 70° and 130° C. and at the bottom of the pressure vessel between 170° and 230° C. and the pressure in the pressure vessel being more than the vapor pressure of the organic expanding agent and the monomers at the temperature prevailing at the bottom of the vessel, and continually discharging the composition of styrene polymer and organic expanding agent at the bottom of the pressure vessel cooling the compound and reducing it in size. High operating pressures, an expensive polymerization pressure vessel, and difficulty of control are, however, required for the continuous production of expandable styrene polymer by the said process.

U.S. Pat. No. 3,026,273 discloses a process for making expandable thermoplastic resin compositions by supplying a mixture of a heat-plastified or molten thermoplastic polymer and a volatile organic compound under superatmospheric pressure at temperatures between 160° and 280° C. to a mixing and cooling zone, advancing the mixture toward an extrusion orifice or die, cooling and blending the mixture during said advancing to a homogeneously heat-plastified mass at temperatures between 90° and 130° C., extruding the heat-plastified mass into a zone of substantially atmospheric pressure, and cooling the extruded material to a rigid condition. There is no teaching in said patent that the source of supply of the heat-plastified thermoplastic polymer is critical in any way to the properties of the expandable polymers obtained by said process. In fact, specific teachings therein show the use of cold granular thermoplastic polymer as being fed first into the heating and pressing section of a plastics extruder wherein the cold granular polymer is heat-plastified or melted, and thereafter the heat-plastified polymer is fed into the mixing and cooling section of the extruder. Additionally, said process is not continuous from the point of freshly polymerized, devolatilized polymeric melt to the expandable polymer product.

The object of this invention is to provide a continuous process for the production of expandable thermoplastic polymer compositions without requiring a pressure vessel for polymerization, it being critical that said process is continuous at least from the point of freshly polymerized, devolatilized polymeric melt prior to cooling all the way to the expandable product, in order to obtain improved product properties.

This object is achieved by continuously supplying, in a process for making expandable thermoplastic resin compositions which comprises supplying a mixture of a heat-plastified thermoplastic polymer and a volatile organic compound under superatmospheric pressure at temperatures between 160° and 280° C. to a mixing and cooling zone, advancing the mixture toward an extrusion orifice or die, cooling and blending the mixture during said advancing to a uniform temperature between about 90° C. and a temperature below the heat-plastifying temperature, extruding the mixture into a zone of substantially atmospheric pressure and cooling the extruded material to a rigid condition (a) as the heat-plastified polymer, freshly polymerized, devolatilized, normally solid, thermoplastic polymeric melt prior to cooling, and (b) the volatile organic compound, and continuously extruding the mixture of heat-plastified polymer and volatile organic compound at a rate equivalent to that at which the devolatilized polymeric melt and volatile organic compound are supplied.

The accompanying drawing is a self-explanatory diagrammatic flow sheet illustrating the process as carried out with continuous flow of material through the series of vessels.

The process of the invention can be employed to make expandable polymeric compositions from any normally solid thermoplastic polymer. Preferred are the normally solid thermoplastic polymers of one or more monovinyl aromatic compounds such as styrene, vinyltoluene, vinylxylene, ethylvinylbenzene, isopropylstyrene, ar-ethylvinyltoluene, di-tert-butyl styrene or nuclear halogenated derivatives of such monovinyl aromatic hydrocarbons, e.g., chlorostyrene, dichlorostyrene, bromostyrene, or fluorostyrene. Thermoplastic copolymers can also be employed in the process and include copolymers of one or more monovinyl aromatic compounds and one or more monoethylenically unsaturated compounds copolymerizable therewith. Such copolymers should contain a major proportion, i.e., at least 50 percent by weight, of the monovinyl aromatic compound(s). Examples of suitable copolymerizable compounds are (1) substituted and unsubstituted alpha-alkyl styrenes such as alpha-methyl styrene, p-methyl-alpha-methyl styrene and alpha-ethyl styrene, (2) nuclear-substituted alkylstyrenes, especially those containing one to eight carbon atoms in the alkyl group, such as ar-methylstyrene, (3) acrylic compounds such as acrylonitrile, alkyl esters of acrylic and methacrylic acid whose alkyl groups contain from one to eight carbon atoms (e.g., methyl methacrylate, ethyl acrylate and butyl acrylate), acrylic acid and methacrylic acid, and (4) alkyl esters of monoethylenically unsaturated dicarboxylic acids (e.g., fumaric acid and maleic acid) whose alkyl groups contain from one to eight carbon atoms. Moreover, thermoplastic copolymers containing a small amount, e.g., from about 0.01 to 0.1 percent by weight, of cross-linking compounds such as polyvinyl aromatic hydrocarbons including divinylbenzene, ethyldivinylbenzene, divinyltoluene, and divinylxylene, butadiene, isoprene, and 1,4-butanediol diacrylate, may be used in the process.

The volatile organic compound to be employed as the expanding or foaming agent in the process can be a liquid or gas at standard temperature and pressure and is a non-solvent or poor solvent for the polymer or only slightly swells it, and has a boiling point which is lower than the softening point of the polymer. In general, the expanding agents have boiling points higher than −50° C. Examples of suitable compounds are aliphatic hydrocarbons such as propane, butane, pentane, hexane, heptane, propylene, butene and the like, and perchlorofluorocarbons such as trichlorofluoromethane, dichlorodifluoromethane, monochlorotrifluoromethane, sym-tetrachloro-difluoroethane, 1,2,2-trichloro-1,1,2-trifluoroethane, sym-dichlorotetrafluoroethane, 1-chloro-1,1,2,2,2-pentafluoroethane, 1-chloro-1,2,2,3,3,4,4-heptafluorocyclobutane, 1,2-dichloro-1,2,3,3,4,4-hexafluorocyclobutane and the like. Mixtures of any two or more of such volatile organic compounds can also be used.

The volatile organic compound can be employed in amounts corresponding to from 0.05 to 0.3, preferably from 0.05 to 0.2, gram molecular proportions of the volatile organic compound per 100 grams of the polymeric material. The volatile organic compound is preferably calculated on a gram molar basis per 100 grams of the freshly polymerized, devolatilized, molten polymeric starting material in order to have present in the final composition an amount of the volatile organic compound sufficient to provide an equal or substantially equal volume of vapors for subsequently expanding the polymer to form a cellular or foamed mass, regardless of the density of the volatile organic compound employed.

The thermoplastic polymer for use in the process of the invention, i.e., the continuously and freshly prepared and devolatilized molten polymerizate, can be made in a polymerization-devolatilization train and process of conventional construction such as is used for example in the continuous production of thermoplastic vinyl aromatic polymers. Polymerization-devolatilization trains, vessels, and processes of this kind can be found for example in U.S. Pat. Nos. 2,727,884; 3,243,481; 2,530,409, and German Pat. No. 1,112,631.

Various methods of carrying out the production of devolatilized, molten polymerizate in a continuous manner for use in the process of the present invention will be apparent. See preceding paragraph for instance. In a preferred embodiment, polymerization of a liquid comprising a monomeric polymerizable thermoplastic compound in a continuous manner is accomplished by a method wherein the monomer(s), or preferably a solution or inert medium containing one or more of such polymerizable compounds, or a prepolymerized solution of monomer and polymer is continuously fed into a vertical elongated polymerization zone, or preferably into a plurality of vertical elongated polymerization zones connected in series, substantially filled with a reacting mass comprising the monomer(s) and the (co)polymer being formed, where the fluid mass is continuously moved forward through the elongated zone, or elongated zones in series, and is subjected to polymerization temperatures of from 85° to 240° C. to progressively polymerize the monomer while at the same time subjecting successive portions of the mass to gentle non-turbulent stirring transversely to the axis of the elongated polymerization zone(s) sufficient to prevent or substantially reduce the tendency for the monomer to channel through the mass and to stratify the mass into layers each containing a progressively increasing amount of polymer as portions of the layers move through the polymerization zone(s), and continuously withdrawing a portion of the mass containing molten polymer in amount corresponding to at least 25 percent by weight of that which is theoretically possible and replenishing the elongated polymerization zone(s) with monomer, a solution thereof in an inert solvent or a solution of monomer and polymer, of lower polymer content than the mass being withdrawn, said mass having the molten polymer separated from the volatile materials contained therein by being forwarded through a devolatilization or finishing zone.

In an alternate embodiment, the fluid reacting mass comprising the monomer(s) and the (co)polymer being formed is continuously moved forward through a horizontal elongated polymerization zone, such as a horizontal screw conveyor polymerization vessel.

The continuously and freshly prepared and devolatilized molten or heat-plastified polymer is continuously supplied or fed, at temperatures between 160° and 280° C. and prior to cooling said polymer, to a mixing and cooling zone containing suitable inlets for feeding materials thereto and a constricted discharge passageway or extrusion orifice or die, similar to the arrangement shown in the accompanying drawing. A volatile organic compound in liquid form, such as heretofore described, is continuously fed under superatmospheric pressure to the mixing and cooling zone via a suitable inlet and into admixture with the molten or heat-plastified polymer in the desired proportion. The resulting mixture is malaxated or blended under superatmospheric pressure and is cooled to a temperature between 90° and a temperature below the heat-plastifying temperature such as 130° C. to form a homogeneously heat-plastified polymeric composition, and is extruded through the die or orifice into a zone of substantially atmospheric pressure. The composition containing the expanding agent/volatile organic compound and thermoplastic polymer is continuously discharged or extruded at a rate equal to that at which the devolatilized polymeric melt and volatile organic compound are continuously supplied. It is advantageous that the composition be discharged directly and almost immediately and prior to appreciable expansion of the extruded material into a cooling means in which it is cooled to a rigid condition. Said cooling means can suitably include immersion of the extruded material in a bath containing an inert liquid coolant, e.g., water or an aqueous salt solution, or spraying the cooling liquid on the extruded material. The cooling means should cool the extruded material to a temperature low enough to prevent expansion of the composition, advantageously cooling to between 0° and 65° C., preferably to between 10° and 50° C. The composition is then withdrawn and is usually cut, ground, broken up or otherwise reduced in size to a granular or particulated form such as, for example, with rotating cutters. The expandable thermoplastic composition is preferably extruded to the form of continuous strands, ribbons or thin sheets which can readily be drawn away from the extrusion orifice or die and rapidly cooled to a rigid condition and, if desired, easily reduced in size to a granular or particulated form. It is also possible to force the thermoplastic composition through dies into a pressure chamber in which the prevailing pressure is higher than the vapor pressure of the expanding agent/volatile organic compound used. The issuing strands are cooled and particulated inside the pressure chamber and then discharged through discharge gates.

Small amounts of additives such as dyes, pigments, flameproofing agents, lubricants, plasticizers, light stabilizing agents, antioxidants or other stabilizers can be incorporated with the polymeric compositions. Such additives are usually employed in amounts of from 0.02 to 5 percent by weight or more of the polymer, but are not required in the invention.

The expandable thermoplastic polymers obtained by the process of this invention may be processed into expanded plastic articles by conventional methods.

A polymerization train similar to that described in U.S. Pat. No. 2,727,884, or a coil type train with at least two independent temperature zones can be used as a polymer source for this invention. Examples of both are given.

The following non-limiting examples serve to illustrate our invention.

EXAMPLE 1

A polymer is produced at 120 lbs/hour rate by the system described in U.S. Pat. No. 2,727,884. It is devolatilized at 265° C. and fed into a header stream where it is split into two equal streams, each at a 60 lbs/hour rate. The polymer is produced at temperature conditions such that its 10 percent solution in toluene has a viscosity of 26.5 centipoise and its Mw/Mn ratio is 3. Taking one of the streams and labeling it 1A, we feed it continuously into a mixing-forwarding device such as an extruder which is equipped with a mixing section. Into this mixing section we add n-pentane at a 4.6 lbs/hour rate. This admixture is continuously forwarded and cooled from the entering temperature of about 235° C. to a temperature of about 135° C. at the stranding die. The continuous strands are exited through the die immediately into a cooling bath with sufficient cooling to prevent expansion. They are heat-treated at 70° C. and continuously pulled into a conventional rotating blade cutter and particulated into expandable polystyrene granules.

The other stream, labeled 1B, is fed to the usual polystyrene stranding die, stranded, cooled and particulated into a granule suitable for injection molding or extrusion applications. These granules are fed into a mixing device similar to that described in U.S. Pat. No. 3,026,273. They are heat-plastified to 200° C. plus in the first section of the extruder at a rate of 60 lbs/hour. To this heat plastified mass is added n-pentane at a rate of 4.6 lbs/hour. The resulting mixture is forwarded, mixed and cooled under pressure to the stranding die where it exits at 135° C. into a cooling bath with sufficient cooling capacity to prevent expansion of the strands. Finishing the strands to expandable polystyrene granules is identical to that done to stream A.

As the expandable polystyrene in both stream 1A and 1B are produced from the identical polymer, it could reasonably be expected to form the same in a molding operation. This is not the case, however. An example of the diverse performance that resulted is the molding range or the range of steam back pressures in the mold during a steaming cycle (using constant line pressure) at which parts with greater than 50 percent fusion and no visible evidence of shrinkage or burn back could be made. The following table demonstrates this difference.

TABLE I

| Stream | Line pressure | Molding range | Foam density |
| --- | --- | --- | --- |

| | | | |
|---|---|---|---|
| 1A | 50 psi | 15–32 | 1.5 lbs/ft³ |
| 1B | 50 psi | 15–26 | 1.5 lbs/ft³ |
| 1A | 35 psi | 13–28 | 1.5 lbs/ft³ |
| 1B | 35 psi | 11–20 | 1.5 lbs/ft³ |

EXAMPLE 2

A polystyrene having a 10 percent solution viscosity in toluene of 13 centipoise and a Mw/Mn ratio of 3.2 is polymerized in a 3-stage polymerization train similar to that described in Example 1. It is split into two streams labeled 2A and 2B. Stream 2A is continuously fed into a mixer where a blowing agent is added to make an expandable polystyrene granule. The 2B stream is taken off as polystyrene granules and is later fed to an extruder as granular polystyrene. Table II illustrates the dramatic difference in molding ranges.

TABLE II

| Stream | Line pressure | Molding range | Foam density |
|---|---|---|---|
| 2A | 50 psi | 13–25 | 1.5 lbs/ft³ |
| 2B | 50 psi | 12–20 | 1.5 lbs/ft³ |
| 2A | 35 psi | 10–20 | 1.5 lbs/ft³ |
| 2B | 35 psi | 8–12 | 1.5 lbs/ft³ |

EXAMPLE 3

Another example is shown which indicates that the novel effect in accordance with the invention is valid over a wide range of polystyrenes. A copolymer of polystyrene and acrylonitrile is produced continuously in a coil reactor as hereinbefore described. It is devolatilized in a normal manner with heat and vacuum, and pumped into a header system at 100 lbs/hour. This copolymer comprises 76 percent styrene and 24 percent acrylonitrile and has a viscosity of 15.5 centipoise at 25° C. in 10 percent toluene solution. The copolymer is taken away in two continuous streams — 3A and 3B. Stream 3A is fed to the forwarding section of an extruder at 40 lbs/hour and cooled to 200° C. as it advances to the mixing section. Freon 11 is injected into the mixing section at 5 lbs/hour and the entire mixture is forwarded into another mixing-cooling zone under about 1,200 psi and cooled to 160° C. at the stranding die. The strands are continuously extruded into the atmosphere and almost immediately cooled to less than 80° C. to prevent expansion. It is then granulated in the manner described in Example 1. Stream 3B is fed to a stranding die, cooled, cut and ground into a granular form acceptable for injection molding. This material is then fed to a plastics extruder and granulated as an expandable particle. As this material is used as a gasoline-resistant or solvent-resistant expandable polymer for steam chest molding, it is subjected to the same end use test as the polystyrene in previous examples, however, the nature of its application calls for lower densities.

TABLE III

| Stream | Line pressure | Molding range | Foam density |
|---|---|---|---|
| 3A | 50 psi | 12–20 | 1 lb/ft³ |
| 3B | 50 psi | 11–16 | 1 lb/ft³ |
| 3A | 35 psi | 10–16 | 1 lb/ft³ |
| 3B | 35 psi | 11–13 | 1 lb/ft³ |

We claim:

1. In a process for making an expandable polymeric composition comprising essentially a normally solid thermoplastic polymer having a volatile organic foaming agent compound uniformly dispersed throughout, which process comprises supplying a mixture of a heat-plastified thermoplastic polymer and a volatile organic foaming agent compound under superatmospheric pressure at temperatures between 160° and 280° C. to a mixing and cooling zone, advancing the mixture toward an extrusion orifice or die, cooling and blending the mixture during said advancing to a uniform temperature between about 90° C. and a temperature below the heat-plastifying temperature, extruding the mixture into a zone of substantially atmospheric pressure and cooling the extruded material to a rigid condition, the improvement which comprises 1. continuously supplying (a) the heat-plastified polymer from a polymerization devolatilization train without cooling the polymer below its thermoplastic temperature, and (b) the volatile organic foaming agent compound, and
2. continuously extruding the mixture comprising the heat-plastified thermoplastic polymer and the volatile organic foaming agent compound at a rate equivalent to that at which the devolatilized polymeric melt and volatile organic foaming agent compound are supplied.

2. The process of claim 1 wherein the thermoplastic polymer is polystyrene.

3. The method of claim 1 including the step of forming the rigid extruded material into a plurality of particles.

* * * * *